| United States Patent [19] | [11] Patent Number: 4,825,249 |
| --- | --- |
| Oki et al. | [45] Date of Patent: Apr. 25, 1989 |

[54] CLEANING BLADE FOR USE WITH PHOTOELECTRONIC COPYING MACHINE

[75] Inventors: Yoshio Oki, Yokkaichi; Takeo Akatsuka, Nagoya; Fuminori Satoji, Kuwana, all of Japan

[73] Assignee: NTN-Rulon Industries Co., Ltd., Tokyo, Japan

[21] Appl. No.: 140,502

[22] Filed: Jan. 4, 1988

[30] Foreign Application Priority Data

Mar. 14, 1987 [JP] Japan .................. 62-59858

[51] Int. Cl.$^4$ ............................ G03G 15/08
[52] U.S. Cl. .................. 355/15; 355/3 DD; 118/652; 430/125; 15/256.5
[58] Field of Search .............. 355/15, 3 DD, 14 D; 15/256.5, 256.51; 118/652; 430/125; 528/902, 905, 906; 264/127

[56] References Cited

U.S. PATENT DOCUMENTS

| 4,083,633 | 4/1978 | Shanly | 355/15 |
| --- | --- | --- | --- |
| 4,218,131 | 8/1980 | Ito et al. | 355/15 |
| 4,247,196 | 1/1981 | Ogawa et al. | 355/15 |
| 4,284,345 | 8/1981 | Sugiyama et al. | 355/15 |
| 4,417,365 | 11/1983 | Murasaki | 15/256.51 |
| 4,469,434 | 9/1984 | Yamazaki et al. | 355/15 |
| 4,537,130 | 8/1985 | Thielacker | 15/256.51 X |
| 4,630,328 | 12/1986 | Croteau | 15/256.51 X |
| 4,639,123 | 1/1987 | Adachi et al. | 355/15 |

Primary Examiner—A. C. Prescott
Attorney, Agent, or Firm—Armstrong, Nikaido, Marmelstein & Kubovcik

[57] ABSTRACT

An improved cleaning blade for a photoelectronic copying machine. It has a sharp, resilient edge and is superior in wear resistance, and lubricating and cleaning properties. The substrate of the cleaning blade is urethane rubber and is coated with perfluoropolyether having a main structural unit represented by $-C_xF_{2x}-O-$ (x is 1, 2, 3 or 4) and having an isocyanate, hydroxyl, carboxyl or amino group at least at one end thereof. It may be coated with a mixture of the perfluoropolyether and an isocyanate group or a hydroxyl group.

3 Claims, No Drawings

CLEANING BLADE FOR USE WITH PHOTOELECTRONIC COPYING MACHINE

BACKGROUND OF THE INVENTION

The present invention relates to a cleaning blade for use with a photoelectronic (dry type) copying machine.

The residual toner on a photosensitive drum and a fixing drum (hereinafter referred to merely as a drum) of a photoelectronic copying machine has heretofore been wiped off by use of a cleaning web of fabric, brushed off by use of a cleaning brush made of pile yarn, or scraped off by use of a cleaning blade of rubber.

With a cleaning web, the drum is liable to suffer mechanical damage because the web is pressed hard against the drum. Further, since the cleaning web is usually housed rolled-up in the copying machine so as to shift the position in contact with the drum and the amount of the cleaning web housed in the machine is small because of limited space in the machine, the web has to be frequently replaced.

Though a cleaning brush is more commonly used, it is difficult to select a proper pile yarn for the brush in quality, hardness and quantity. Also, the cleaning brush tends to cause mechanical damage on the drum surface or cause it to be electrostatically charged owing to the friction, making it difficult to remove toner from the drum surface and thus deteriorating the performance of the drum. Further the cleaning brush itself wears rapidly and requires repeated replacements.

As for a cleaning blade, it is simple in mechanism and compact in size and thus most commonly used. But, with the blade made of a single material such as urethane rubber, neoprene rubber or silicone rubber, if the blade is pressed too hard against the drum, its edge will rapidly wear due to severe friction. If the pressure is too small, then toner will not be completely scraped off.

In order to improve the lubricating properties of the cleaning blade at its edge, it has been tried to cover the edge with a solid fluorine plastic. But this might blunt otherwise sharp edge which is one of the most important properties as a cleaning blade. Also, covering a solid fluorine plastic on a metallic blade and grinding it to obtain a sharp edge has been proposed (e.g. in the Japanese Patent Publication No. 55-77773). But, with this method, the resilience would be poor compared with the rubber cleaning blade. There is also known a method in which a silicone oil having reactive groups at the ends thereof is reacted with an urethane rubber blade (e.g. in Japanese Patent Publication No. 59-15967). In this method, however, the silicone coating tends to gradually peel off with use.

An object of the present invention is to provide a cleaning blade which is excellent in resistance to wear and lubricating and cleaning properties and which allows a copying machine to keep producing beautiful copies semi-permanently.

SUMMARY OF THE INVENTION

In accordance with the present invention, there is provided a cleaning blade comprising a substrate of urethane rubber coated with either perfluoropolyether having a main structural unit represented by a formula $-C_xF_{2x}-O-$ (x is 1, 2, 3 or 4) and having an isocyanate, hydroxyl, carboxyl or amino group at least at one end thereof, or a mixture of such a perfluoropolyether and an isocyanate compound or a hydroxyl compound.

DETAILED DESCRIPTION OF THE PREFERRED EMBODIMENT

Isocyanates, which are main ingredients of urethane rubber, have isocyanate groups in their molecules and react with compounds having active hydrogen atoms to form various polymers. For example, isocyanate groups (—NCO) react with hydroxyl groups (—OH) to form urethane bonds (—NHCOO—), and react with amino groups (—NH$_2$) to form urea bonds (—NHCONH—). These bonds react with isocyanate groups as urethane derivatives or urea derivatives containing active hydrogen atoms to form allophanate bonds, such as

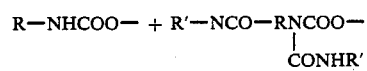

Thus, the molar ratio which allows all the groups to be reacted cannot be determined beforehand. Thus it is inevitable that part of compounds or derivatives having isocyanate groups or active hydrogen atoms remain unreacted.

Therefore, in accordance with the present invention, perfluoropolyether having a main structural unit $-C_xF_{2x}-O-$ (x is 1, 2, 3 or 4) and having at least at one end thereof a hydroxyl, carboxyl, isocyanate or amino group which is reactive with such unreacted compounds or derivatives is caused to react on the surface of the urethane rubber substrate to form a coating of perfluoropolyether. The wear resistance can be further improved by adding to such a perfluoropolyether an isocyanate compound or a hydroxyl compound which has a reactivity or affinity to the urethane rubber substrate.

The isocyanate compounds mentioned herein mean compounds containing an isocyanate group at least at one end of each molecule thereof, such as 2,4-tolylene diisocyanate

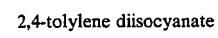

methylene phenyl isocyanate

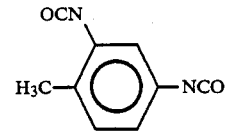

or a derivative of the 2,4-tolylene diisocyanate

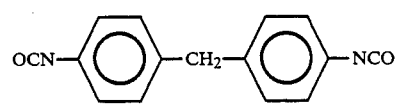

-continued

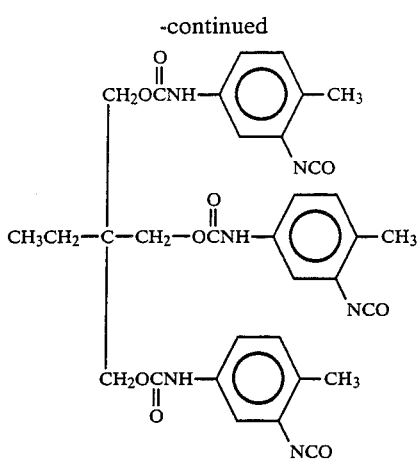

Hydroxyl compounds are ones containing a hydroxyl group at least at one end and refer herein to compounds having a hydroxyl group at one end of polyester, polyether or polyacryl, such as

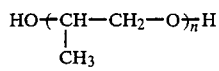

In order to form a coating of perfluoropolyether with or without isocyanate compound or hydroxyl compound, they may be dissolved or dispersed in an organic solvent e.g. a ketone such as acetone and methylethylketone, an ester such as ethyl acetate and methyl acetate, an ether such as diethylether and dioxane, a halogenated hydrocarbon such as methyl chloroform, trichloroethylene, 1,1,2-trichloro-1,2,2-trifluoroethane (fleon R113), or the mixture of two or more of them, and be adjusted to a suitable viscosity.

The resulting solution may be applied to the substrate surface in a conventional way such as by dipping, spraying or brushing. But the dip coating is the most economical and most preferable way because with this method the solution can be applied with the least waste of solution. After the application, its solvent is caused to evaporate. As the urethane rubber to be used for the substrate, one having a hardness of 50–90 degrees in scale A under JIS (Japanese Industrial Standard) is preferable because it has elasticity and toughness necessary as a cleaning blade.

The thickness of the coating of perfluoropolyether should preferably be at 0.01–5.0 microns. If it is less than 0.01 micron, a sufficient wear resistance or lubricating properties would not be expected. If it is over 5 microns, part of its end reactive groups might remain unreacted, deteriorating the lubricating properties. Various kinds of perfluoropolyether each having different polar groups may be used in combination to improve the wear resistance.

The cleaning blade in accordance with the present invention comprising an urethane rubber substrate has a sharp and resilient edge and is superior to the prior art blade in wear resistance, lubricating (or sliding) properties and cleaning properties as well as from an economic viewpoint.

EXAMPLE 1

A cleaning blade (450 mm×30 mm×3 mm, edge's R 0.001 or less, formed to the same size as the cleaning blade of urethane rubber used in the copying machine Model S-2 made by RICHO) and a friction test piece was prepared by molding urethane rubber (TI-PRENE TR100-7 made by Tigers Polymer Corporation). The blade and a friction test piece were vertically dipped into a 2.0 per cent by weight solution of perfluoropolyether having an isocyanate group at least at one end thereof (Fomblin Z-DISOC made by Montefluos in Italy) in fleon R113, and lifted at a speed of about 50 mm per minute, and then dried for ten minutes at a temperature of about 70° C. Two kinds of specimens thus obtained (with a coating about 0.4 micron thick) were tested for the change of the coefficient of friction with time (that is, stability), anti-stick quality and duration of life in the following manner:

(1) Change of the coefficient of friction with time

It was measured by use of a thrust type friction tester (made by N.T.N.-Roulon Industries Co., Ltd.). The specimens were rubbed against a bearing steel (SUJ 2 in JIS) under a pressure $P=3$ kg/cm$^2$ and at a speed $V=1$ m/minute. A predetermined amount (5 grams) of toner not containing any lubricant was applied to the sliding surface at the beginning of test and every hour thereafter. The symbols O and X in the table indicate that the change of the coefficient of friction with time was small and rather large, respectively.

(2) Antistickiness

Since the surface tension of toner and that of acetic acid are interrelated to each other, the contact angle of acetic acid was measured by use of a goniometer type contact angle meter at the sliding surface before and after the friction test. The larger the contact angle, the better the anti-stick property was judged to be.

(3) Duration of life

A cleaning blade was removed from a copying machine (Model S-2 made by RICHO) and a specimen having the same shape as the cleaning blade was attached instead. The machine was subjected to consecutive copying operations by use of toner containing no lubricant until the pictures copied blur. The duration of life was determined by the number of clean copies obtained. The results are listed in the table.

EXAMPLE 2

Two kinds of specimens were prepared with the same process as in Example 1 except that perfluoropolyether having a hydroxyl group at least at one end thereof (Fomblin Z-DOL made by Montefluos of Italy) was used in place of perfluoropolyether having an isocyanate group at least at one end thereof. The specimens were tested in the same manner as in Example 1 and the results are listed in the table.

EXAMPLE 3

Two kinds of specimens were prepared with the same process as in Example 1 except that perfluoropolyether having a carboxyl group at least at one end thereof (Fomblin Z-DIACID made by Montefluos of Italy) was used in place of perfluoropolyether having an isocyanate group at least at one end thereof. The two specimens were tested in the same manner as in Example 1 and the results are listed in the table.

EXAMPLE 4

Two kinds of specimens were prepared with the same process as in Example 1 except that the coating material was a mixture of a 1 percent by weight solution of perfluoropolyether having a hydroxyl group at least at one end thereof in fleon R 113 and a 2 percent by weight solution of an isocyanate compound (CORONATE 2014 made by Nippon Polyuletan Co., Ltd.) in xylene. The two specimens were then tested in the same manner and the results are listed in the table.

EXAMPLE 5

Two kinds of specimens were prepared with the same process as in Example 1 except that the coating material was a mixture of a 2 percent by weight solution of perfluoropolyether having an isocyanate group at least at one end thereof in fleon R113 and a 1 percent by weight solution of polyester diol (Nippollan 136 made by Nippon polyuletan Co., Ltd.) in acetone. The specimens obtained were tested in the same manner as in Example 1. The results are listed in the table.

COMPARISON EXAMPLE 1

Two kinds of specimens were prepared with the same process as in Example 1 except that perfluoropolyether having no reactive groups at the ends thereof (Fomblin Z-2 made by Montefluos of Italy) was used in place of perfluoropolyether having an isocyanate group at least at one end thereof and were tested in the same manner as in Example 1. The results are listed in the table.

COMPARISON EXAMPLE 2

Two kinds of specimens were prepared with the same process as in Example 1 except that no perfluoropolyether solution was applied to the substrate of a cleaning blade, and were subjected to the same tests as before. The results are shown in the table.

COMPARISON EXAMPLE 3

Two kinds of specimens were prepared with the same process as in Example 1 except that silicone oil having a hydroxyl group at ends thereof (Silicone oil X22-160C made by Shinetsu Kagaku Kogyo Co., Ltd.) was used in place of perfluoropolyether, and were subjected to the same tests as before. The results are shown in the table.

COMPARISON EXAMPLE 4

Two kinds of specimens were prepared with the same process as in Example 1 except that a fluoroalkyl polymer $C_8F_{17}C_2H_4OH$ having a hydroxyl group at ends thereof was used in place of perfluoropolyether, and were subjected to the same tests as before. The results are shown in the table.

COMPARISON EXAMPLE

Two kinds of specimens were prepared with the same process as in Example 1 except that a copolymer of perfluoroalkyl and methyl methacrylate (perfluoroalkyl copolymer containing hydroxyl groups, MODIPER F100 made by Nihon Yushi Co., Ltd.), was used in place of perfluoropolyether, and were subjected to the same tests as before. The results are listed in the table.

As for the results listed in the table, when no coating of a lubricating polymer was applied to the urethane rubber substrate (in Comparison Example 2), the coefficient of friction increased until measurement became impossible. When the coating of perfluoropolyether having no reactive groups was applied to the substrate (in Comparison Example 1), the change of coefficient of friction was substantially the same as in the Comparison Example 1. Even when the coating of a silicone oil, a fluoroalkyl polymer or a copolymer of perfluoroalkyl and methyl methacrylate was applied to the substrate (in Comparison Examples 3, 4 and 5), the coefficient of friction increased with time though the growth rate was moderate. Thus, it turned out that the coefficient of friction in the Comparison Examples 1 to 5 was not stable. On the other hand, in Examples 1 to 5, the coefficient of friction was so stable that no distinctive increase with time was observed.

A marked difference between the specimens in the Examples and the Comparison Examples was clearly seen from the results of measurement of contact angle, too. For example, owing to the fact that the copolymers used in Example 2 and Comparison Examples 3 and 4 are different though the reactive groups at their ends are identical, the results obtained are remarkably different. Namely, in Example 2 the contact angles measured before and after the test were substantially the same, while in the Comparison Examples 3 and 4, the measurements after the test was remarkably lower than those before the test. It means that the antistickiness of Comparison Examples dropped after the test.

As for duration of life, the specimens in Comparison Examples 1 and 2 produced only less than 10,000 copies, and those in Comparison Example 3 produced about 65,200 copies which is the biggest of all the specimens in the Comparison Examples, whereas the specimens in any of the Examples produced 90,000 copies or more. In particular, the specimens in Examples 4 and 5, the coating of which was made from a mixture of two kinds of solutions, showed excellent results. Thus it can be concluded from the measurements in the table that the specimens in the Examples are far superior to those in the Comparison Examples.

| | No. | | | | | | | | | |
|---|---|---|---|---|---|---|---|---|---|---|
| | Examples | | | | | Comparison Examples | | | | |
| Test items | 1 | 2 | 3 | 4 | 5 | 1 | 2 | 3 | 4 | 5 |
| Change of friction coefficient with time | | | | | | | | | | |
| Before test | 0.40 | 0.26 | 0.30 | 0.26 | 0.28 | 0.35 | 0.50 | 0.30 | 0.30 | 0.40 |
| 3 hours after test | 0.38 | 0.24 | 0.30 | 0.25 | 0.28 | 0.65 | 1.95 | 0.35 | 0.40 | 0.40 |
| 6 hours after test | 0.36 | 0.23 | 0.29 | 0.23 | 0.26 | 1.15 | Δ | 0.40 | 0.60 | 0.45 |
| 9 hours after test | 0.36 | 0.22 | 0.29 | 0.21 | 0.24 | Δ | Δ | 0.47 | 0.95 | 0.47 |
| 12 hours after test | 0.37 | 0.21 | 0.28 | 0.21 | 0.24 | Δ | Δ | 0.53 | 1.8 | 0.60 |
| 15 hours after test | 0.36 | 0.21 | 0.29 | 0.21 | 0.24 | Δ | Δ | 0.60 | Δ | 0.90 |
| Stability | O | O | O | O | O | X | X | X | X | X |
| Contact angle (in degree) | | | | | | | | | | |
| Before test | 92-98 | 97-102 | 97-100 | 98-104 | 98-103 | 90-93 | 63-66 | 88-95 | 80-88 | 92-98 |
| After test | 91-96 | 97-101 | 95-99 | 97-101 | 96-101 | 60-66 | 60-64 | 75-79 | 62-67 | 61-65 |

-continued

| Test items | No. | | | | | | | | | |
|---|---|---|---|---|---|---|---|---|---|---|
| | Examples | | | | | Comparison Examples | | | | |
| | 1 | 2 | 3 | 4 | 5 | 1 | 2 | 3 | 4 | 5 |
| Life (number of copies) × 1000 | 90.6 | 106.5 | 99.2 | 110.5 | 107.0 | 9.7 | 1.7 | 65.2 | 45.3 | 55.5 |

Δ denotes "impossible to measure".

What is claimed is:

1. A cleaning blade for use with a photoelectronic copying machine, comprising a substrate of urethane rubber coated with perfluoropolyether having a main structural unit represented by formula
   —$C_xF_{2x}$—O— (x is 1, 2, 3 or 4) and having a group selected from the group consisting of isocyanate, hydroxyl, carboxyl and amino groups at least at one end thereof.

2. A cleaning blade for use with a photoelectronic copying machine, comprising a substrate of urethane rubber coated with a mixture of perfluoropolyether having a main structural unit represented by formula
   —$C_xF_{2x}$—O— (x is 1, 2, 3 or 4)
   and having a group selected from the group consisting of isocyanate, hydroxyl, carboxyl and amino groups at least at one end thereof, and an isocyanate compound.

3. A cleaning blade for use with a photoelectronic copying machine, comprising a substrate of urethane rubber coated with a mixture of perfluoropolyether having a main structural unit represented by formula
   —$C_xF_{2x}$—O— (x is 1, 2, 3 or 4)
   and having a group selected from the group consisting of isocyanate, hydroxyl, carboxyl and amino groups at least at one end thereof, and a hydroxyl compound.

* * * * *